C. MACBETH AND H. WILLSHAW.
MACHINE FOR CALENDERING VULCANITE BASES FOR SOLID RUBBER TIRES.
APPLICATION FILED APR. 10, 1919.

1,320,334.

Patented Oct. 28, 1919.
2 SHEETS—SHEET 1.

C. MACBETH AND H. WILLSHAW.
MACHINE FOR CALENDERING VULCANITE BASES FOR SOLID RUBBER TIRES.
APPLICATION FILED APR. 10, 1919.

1,320,334.

Patented Oct. 28, 1919.

UNITED STATES PATENT OFFICE.

COLIN MACBETH AND HARRY WILLSHAW, OF BIRMINGHAM, ENGLAND, ASSIGNORS TO THE DUNLOP RUBBER COMPANY, LIMITED, OF WESTMINSTER, LONDON, ENGLAND.

MACHINE FOR CALENDERING VULCANITE BASES FOR SOLID RUBBER TIRES.

1,320,334. Specification of Letters Patent. Patented Oct. 28, 1919.

Application filed April 10, 1919. Serial No. 289,105.

*To all whom it may concern:*

Be it known that we, COLIN MACBETH and HARRY WILLSHAW, both subjects of the King of Great Britain, residing at Para Mills, Aston Cross, Birmingham, in the county of Warwick, England, have invented new and useful Improvements in or Relating to Machines for Calendering Vulcanite Bases for Solid Rubber Tires, of which the following is a specification.

This invention relates to machines for calendering rubber strips, and more particularly to machines for calendering strips which form the vulcanite bases for solid rubber tires, said machines being generally known as calenders.

Usually the vulcanite bases for solid rubber tires are made by cutting the rubber or vulcanite as it leaves the calender rolls into strips of the required width, which strips are simultaneously batched up or wound into roll form on to a single roller at one or each side of the calender or onto a number of narrow rollers mounted on a common shaft. Owing to the time required for putting in empty rollers and removing them when the strips have been wound thereon the operation of the calender is intermittent and the output is therefore restricted; one object of the present invention is to enable the operation of calendering to be continuously carried out, and to enable each strip to be batched up into roll form ready for placing on the metal foundation bands of the tires. A further object of the invention is to prevent the lining or separating material, which is wound between the convolutions of the rubber or vulcanite strip during the "batching up" operation from creasing and rendering the calendered surface of the rubber or vulcanite strip uneven owing to the creases in the lining material leaving impressions in the strip.

According to this invention, we provide independent or separate batching-up rollers on to which the cut strips of rubber or vulcanite are wound as they leave the calender rolls, the said rollers being so arranged that any one or more of them may be removed and replaced without stopping the operation of the calender. The batching-up rollers may be detachably mounted in specially constructed tipping or rocking frames at both sides of the calender and alternate strips are wound on to the batching-up rollers at one side while the intervening strips are wound on to the batching-up rollers at the other side thereby providing sufficient space between adjacent strips to prevent them sticking together. The lining or separating material for each rubber strip is supported in spool form in the frame of each batching-up roller and during the winding or batching up of each rubber strip, the lining material is also unwound from its spool and wound on to its respective batching-up roller between the convolutions of the rubber strip. Each lining strip is passed over or around suitable rollers or pins and may be controlled by a spring or weight which places it under tension and enables it to be evenly wound between the convolutions of the rubber strip so as to prevent creases being formed therein and impressions being made in the rubber strip. The knives for cutting the sheet of rubber into strips are adjustable for enabling various widths of strips to be cut and the batching up rollers are also adjustable so that they can be set into positions to suit the widths of strips to be cut.

In order that the said invention may be clearly understood and readily carried into effect, the same will now be more fully described with reference to the accompanying diagrammatic drawings in which:—

Figure 2:
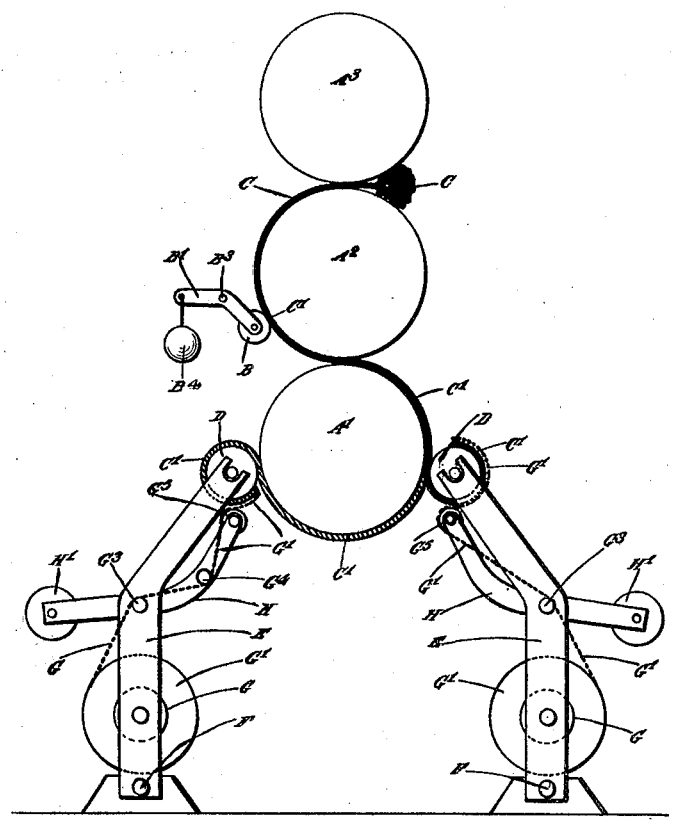
Fig. 2 is an end view showing the method of batching up the strips at the front and rear of the calender rolls.

A represents the calender frame and A' A² A³ indicate the three calender rolls. As shown in Fig. 2 the rubber is fed between the rolls A³ A² from whence it passes around the rolls A² A' as indicated.

Figure 1:
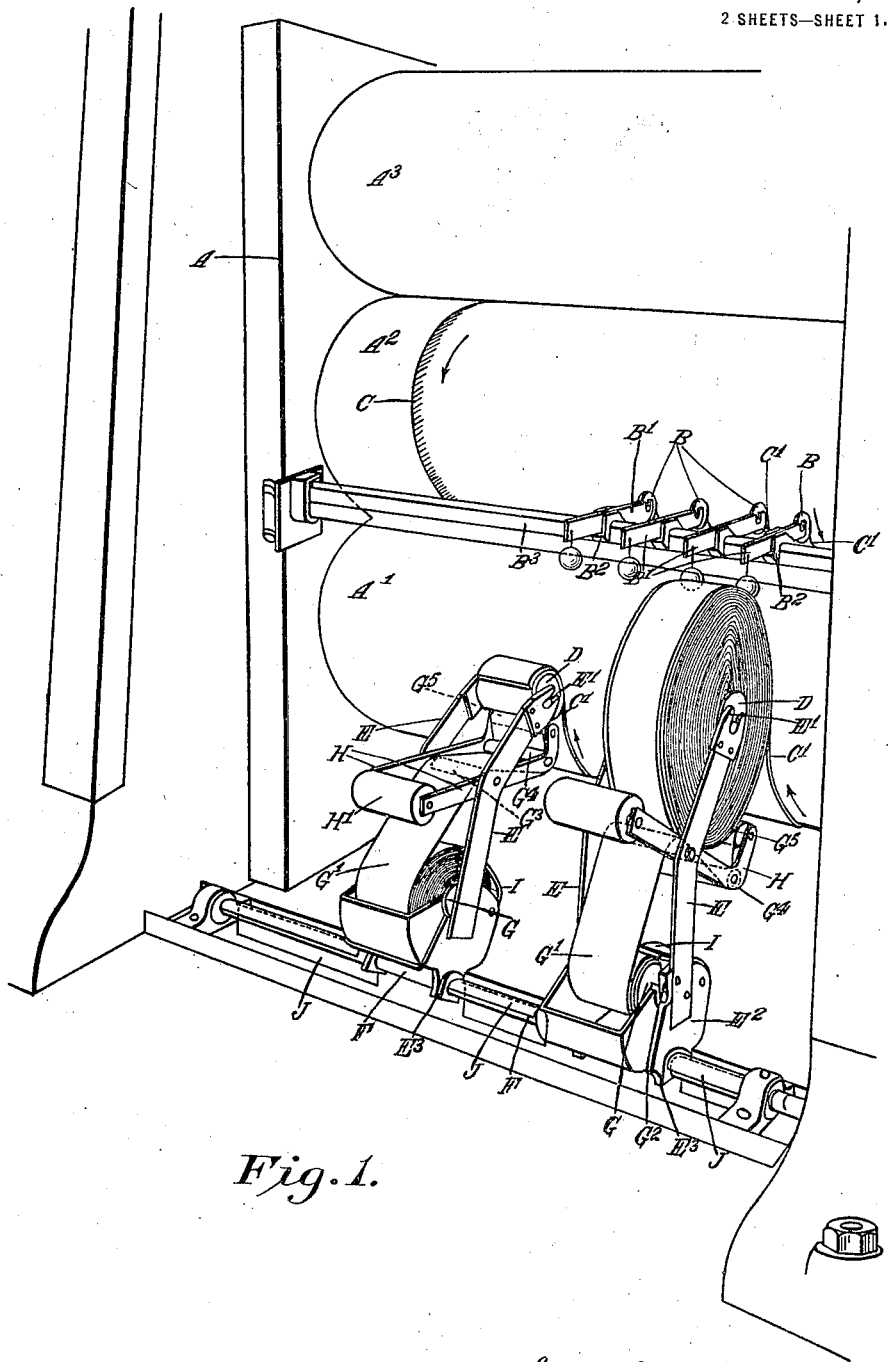
Figure 1 shows in perspective one side of a three roll calender with one embodiment of the invention applied thereto.

B, B are the cutting knives which may be of circular or any other suitable shape and are supported at the inner ends of levers B' which may be pivoted in brackets B² as shown in Fig. 1 slidably disposed upon a rod B³ (or as shown in Fig. 2 the knives may be directly provided on a rod B³) which rod is disposed parallel with the calender rolls and near to the position where the rubber C passes between the middle and lower calender rolls A' and A² respectively. The knives may be maintained in position to engage with and cut the rubber C at points C' on the middle calender roll A² by any suitable means such as weights suspended from the outer ends of the levers B'. The rubber after being cut leaves the point of nip between the middle and lower calender rolls in the form of parallel strips C'. Alternate strips C' pass around and under the lower calender roll A' to the batching-up rollers D on one side (say the front) of the calender rolls and the intervening strips pass from the point of nip to similar batching up rollers at the other or rear side of the machine (see Fig. 2). The batching-up rollers and parts appertaining thereto at the rear side of the machine are not illustrated in Fig. 1 and are only indicated in outline in Fig. 2; the following description of those at the front side of the calender rolls will apply to those which are arranged at the rear side. The frames supporting the batching up rollers D each comprise two supports E which are forked or bifurcated at their upper ends E' and the batching up rollers D can be readily placed in the forked ends E' of the supports E or removed therefrom. The lower parts of the supports E are secured to or form part of a base E² which is slidable along a rod F so that the various frames of the batching up rollers can be adjusted either individually or collectively in accordance with the position of the cutting knives B. The frames of the batching-up rollers are independent of each other and each is capable of rocking on the rod F to enable the supports E to assume an operative or inoperative position. The lining strip G' to be wound between the convolutions of each rubber strip is supported in roll or spool form on a roller G which is detachably mounted in slots G² in the base E² of each supporting frame E, the lining strip G' being adapted to be passed between the supports E and around suitable pins or rollers such as G³, G⁴ and G⁵ (at the front side of the calender rolls) prior to reaching the batching up roller D; at the rear side of the machine the lining strip G' only passes around two pins or rollers G³, G⁵ as hereinafter referred to, the pins or rollers over or around which the lining strip G' travels are mounted in a weighted lever frame H which serves as a guide for the lining strip G', and enables it to be evenly laid on the batching-up roller.

When it is desired to wind one of the rubber strips C' onto a batching-up roller D at the end of the said strip C' and the lining strip G' are secured to the batching-up roller and the supports E are moved or rocked on the said rod F so that the batching-up roller rests against the lower calender roll A' and thus receives rotary motion with the result that the strip C' and the lining strip G' are wound onto the batching up roller. During the winding of the strips C' and G' and the consequent increase in diameter of the roll or spool so formed the supporting frame carrying the batching up roller is caused to angularly move on its rod F in a direction away from the calender roll until the strip C' and the lining strip G' are fully wound onto the roller D when the supporting frame carrying the batching up roller can be angularly moved on the rod F out of contact with the calender roll into an inoperative position and retained therein by a suitable stop or abutment E³ on the base E² bearing against a suitable part of the calender frame. The fully loaded batching-up roller can then be readily removed and the rubber strip C' wound thereon is ready for application to the solid tire foundation band.

According to one method of obtaining continuous calendering, the batching-up rollers on each side of the calender are successively placed against the lower calender roller A', so that the winding of the strips is successively commenced; consequently the batching up rollers become fully loaded in succession. The first fully loaded roller is removed and replaced by an empty roller to enable the strip emerging from the calender roll to be batched up. The next fully loaded roller is removed and replaced by any empty one and so on with the result that the removal and replacement of the batching up rollers can be effected without stopping the calendering operation; thus the apparatus may be kept running at an even speed continuously. The weighted lever frame H may be pivoted on the supports E and the lining strip G' first passes over the roller G³ which is co-axial with the pivots of the lever frame H, then under the roller G⁴ at the end of the lever frame H adjacent to the batching up roller, and then over the roller G⁵ which is maintained in contact with the batching up roller or the rubber strip C' thereon by the weight H' at the other end of the lever frame H. In the case of the batching-up rollers at the rear of the calender where the relation of travel of the calender roll A' to the batching up roller is reversed, the lining strip G' is passed from the roller G³ direct to the roller G⁵ and then under and around the batching up roller so as to be wound between the convolutions of the strip C'. The weighted lever frame H in either case insures accurate placing of the lining strip G' during the batching winding up of the vulcanite strip and a friction brake or spring I may bear on each roll of the lining strip G' as it unwinds, thereby causing a drag on the strip and maintaining it under proper tension. Adjacent to and between the bases E² of the frames carrying the batching up rollers, distance pieces J in the form of bars or plates are supported on the rod F, the ends of the said bars or plates constituting stops against which the said frames abut. Similar distance pieces may be provided on the rod B³ between and adjacent to the brackets B² carrying the supporting knives B or the knives themselves (see Fig. 2). Various lengths of distance pieces may be readily placed between or adjacent to the frames carrying the batching-up rollers and between and adjacent to the knives according to the desired width of rubber strip which is to be cut and batched up.

Although the invention has been described in connection with the calendering of rubber strips, it will be understood that the means herein set forth may be used for cutting material of any kind into strips and winding or batching up the strips on to separate and independent rollers, in the manner hereinbefore described.

What we claim and desire to secure by Letters Patent of the United States is:—

1. A machine for calendering rubber strips in which the strips as they leave the calender rolls are wound on to separate and independent batching-up rollers which are so constructed and arranged that any one or more of them can be readily removed bodily from its support and replaced without stopping the calendering or batching-up operation, substantially as and for the purpose specified.

2. A machine for calendering rubber strips in which the batching-up rollers are bodily detachably mounted in separate and independent rocking or tipping frames adapted to be set into a position in which the batching-up rollers bear against one of the calender rolls which imparts rotation to the batching-up rollers and causes the strips leading from the calender rolls to be wound on to the batching-up rollers, substantially as and for the purpose specified.

3. A machine for calendering rubber strips in which separate and independent batching-up rollers are mounted at each side of the calender rolls, so that alternate strips pass from the lower calender roll to the batching-up rollers at one side, while the intervening strips pass from the point of nip between the lower calender roll and the roll above it, direct to the batching-up rollers at the other side of the calender rolls, substantially as and for the purpose specified.

4. A machine for calendering rubber strips in which the knives which cut the calendered rubber into strips are adjustable to produce strips of various widths which can be wound on to separate and independent batching-up rollers which are adjustable to suit the widths of strips being cut, substantially as and for the purpose specified.

5. A machine for calendering rubber strips in which the batching-up rollers are detachably mounted in separate and independent frames each of which supports a roll or spool of lining material which is wound in strip form on to the batching-up roller so as to lie between the convolutions of the rubber strip during the winding of the latter on to the batching-up roller, substantially as and for the purpose specified.

6. A machine for calendering rubber strips in which the batching-up rollers are detachably mounted in separate and independent frames each of which comprises supports forked at their upper ends to receive the batching-up rollers, the lower ends of said supports being secured to a base which is slidably and angularly movable on a rod disposed parallel with the calender rolls, substantially as and for the purpose specified.

7. A machine for calendering rubber strips, in which the batching-up rollers are detachably mounted in separate and independent frames each of which comprises supports forked at their upper ends to receive the batching-up roller, the lower ends of said supports being secured to a base which is slidably and angularly movable on a rod disposed parallel to the calender rolls, each of which bases supports a roll or spool of lining material which in passing to the batching-up rollers, passes over or around rollers or pins mounted in a weighted frame pivoted to the said supports, substantially as and for the purpose specified.

8. A machine for calendering rubber strips comprising cutting knives which are slidably adjustable along a rod disposed parallel to the calender rolls, and separate and independent frames in which the batching-up rollers are detachably supported, which frames are angularly movable and slidable on a rod parallel to the aforesaid knife rod, the position to which the said knives and frames can be set being determined by distance pieces according to the width of strip to be cut and batched up, substantially as and for the purpose specified.

9. A machine for calendering rubber strips comprising calender rolls, means coöperating with said rolls for forming strips, a batching-up roller adapted to have one of said strips wound thereon, means for supplying a lining strip to the batching-up roller, and a weight coöperating with said lining strip, for the purpose described.

10. A machine for calendering rubber strips comprising calender rolls, cutting knives coöperating with said rolls, a batching-up roller adapted to receive each strip formed by said knives, a roller supporting a lining strip, guide rolls between said lining strip roller and the batching-up roller, and means for exerting pressure upon said guide rollers to insure that the lining strip will be evenly fed to the batching-up roller.

COLIN MACBETH.
HARRY WILLSHAW.

Copies of this patent may be obtained for five cents each, by addressing the "Commissioner of Patents, Washington, D. C."